United States Patent
DeCristofaro et al.

(10) Patent No.: US 6,675,459 B1
(45) Date of Patent: Jan. 13, 2004

(54) BULK AMORPHOUS METAL MAGNETIC COMPONENTS FOR ELECTRIC MOTORS

(75) Inventors: Nicholas J. DeCristofaro, Chatham, NJ (US); Peter Joseph Stamatis, Morristown, NJ (US); Gordon E. Fish, Upper Montclair, NJ (US)

(73) Assignee: Metglas, Inc., Conway, SC (US)

( * ) Notice: Subject to any disclaimer, the term of this patent is extended or adjusted under 35 U.S.C. 154(b) by 341 days.

(21) Appl. No.: 09/678,868

(22) Filed: Oct. 2, 2000

Related U.S. Application Data (60) Division of application No. 09/470,707, filed on Dec. 23, 1999, which is a continuation-in-part of application No. 09/187,656, filed on Nov. 6, 1998.

(51) Int. Cl.[7] .............................................. H02K 15/16
(52) U.S. Cl. ......................................... 29/596; 310/216
(58) Field of Search .......................... 29/596, 598, 606, 29/609; 310/256, 154.01, 156.21, 216

(56) References Cited

U.S. PATENT DOCUMENTS

| | | | |
|---|---|---|---|
| 3,813,763 A | * | 6/1974 | Church ........................ 29/596 |
| 4,187,441 A | | 2/1980 | Oney |
| 4,201,837 A | | 5/1980 | Lupinski |
| 4,255,684 A | | 3/1981 | Mischler et al. |
| 4,268,325 A | | 5/1981 | O'Handley et al. |
| 4,286,188 A | | 8/1981 | Honsinger et al. |
| 4,343,347 A | * | 8/1982 | Liebermann et al. ....... 164/463 |
| 4,363,988 A | | 12/1982 | Kliman |
| 4,385,932 A | | 5/1983 | Inomata et al. |
| 4,392,072 A | | 7/1983 | Rosenberry |
| 4,392,073 A | | 7/1983 | Rosenberry, Jr. |
| 4,394,597 A | | 7/1983 | Mas |
| 4,403,401 A | | 9/1983 | Rosenberry |
| 4,427,462 A | | 1/1984 | Senno et al. |
| 4,578,610 A | | 3/1986 | Kliman et al. |
| 4,716,556 A | | 12/1987 | Raskin et al. |
| 4,763,030 A | | 8/1988 | Clark et al. |
| 4,794,360 A | * | 12/1988 | van Mensvoort ........... 336/178 |
| 5,160,379 A | | 11/1992 | Yoshizawa et al. |
| 5,252,877 A | | 10/1993 | Sawa et al. |
| 5,258,681 A | | 11/1993 | Hibino et al. |
| 5,270,595 A | | 12/1993 | Wisner |
| 5,355,045 A | | 10/1994 | Hisey |
| 5,522,948 A | | 6/1996 | Sawa et al. |
| 5,671,524 A | | 9/1997 | Damsky et al. |
| 5,731,649 A | * | 3/1998 | Caamano ..................... 310/216 |
| 5,873,954 A | | 2/1999 | Liebermann et al. |
| 5,918,359 A | * | 7/1999 | Neuenschwander ........ 29/564.2 |
| 5,935,347 A | | 8/1999 | Suzuki et al. |

FOREIGN PATENT DOCUMENTS

| | | |
|---|---|---|
| EP | 0 058 269 A1 | 8/1982 |
| EP | 0 430 085 A2 | 6/1991 |
| WO | WO 96/00449 | * 1/1996 |

* cited by examiner

Primary Examiner—Gregory Vidovich
Assistant Examiner—Stephen Kenny
(74) Attorney, Agent, or Firm—Ernest D. Buff & Associates, LLC; Ernest D. Buff; Gordon E. Fish (57) ABSTRACT

A high efficiency electric motor has a generally polyhedrally shaped bulk amorphous metal magnetic component in which a plurality of layers of amorphous metal strips are laminated together to form a generally three-dimensional part having the shape of a polyhedron. The bulk amorphous metal magnetic component may include an arcuate surface, and preferably includes two arcuate surfaces that are disposed opposite to each other. The magnetic component is operable at frequencies ranging from about 50 Hz to about 20,000 Hz. When the motor is operated at an excitation frequency "f" to a peak induction level $B_{max}$ the component exhibits a core-loss less than "L" wherein L is given by the formula $L=0.0074\ f\ (B_{max})^{1.3}+0.000282\ f^{1.5}\ (B_{max})^{2.4}$, said core loss, said excitation frequency and said peak induction level being measured in watts per kilogram, hertz, and teslas, respectively. Performance characteristics of the bulk amorphous metal magnetic component of the present invention are significantly better than those of silicon-steel components operated over the same frequency range.

6 Claims, 6 Drawing Sheets

BULK AMORPHOUS METAL MAGNETIC COMPONENTS FOR ELECTRIC MOTORS

CROSS-REFERENCE TO RELATED APPLICATION

This application is a Divisional of Co-Pending U.S. Ser. No. 09/470,707 filed on Dec. 23. 1999, which is a Continuation-in-Part of application Ser. No. 09/187,656, filed Nov. 6, 1998, entitled "Bulk Amorphous Metal Magnetic Components For Electric Motors."

BACKGROUND OF THE INVENTION

1. Field Of The Invention

This invention relates to amorphous metal magnetic components, and more particularly, to a high efficiency electric motor having a generally polyhedrally shaped bulk amorphous metal magnetic component.

2. Description Of The Prior Art

An electric motor typically contains magnetic components made from a plurality of stacked laminations of non-oriented electrical steel. In variable reluctance motors and eddy current motors, the stators are made from stacked laminations. Both the stator and the rotor are made from stacked laminations in squirrel cage motors, reluctance synchronous motors and switched reluctance motors. Each lamination is typically formed by stamping, punching or cutting the mechanically soft, non-oriented electrical steel into the desired shape. The formed laminations are then stacked and bound to form the rotor or stator.

Although amorphous metals offer superior magnetic performance when compared to non-oriented electrical steels, they have long been considered unsuitable for use in bulk magnetic components such as the rotors and stators of electric motors due to certain physical properties and the corresponding fabricating limitations. For example, amorphous metals are thinner and harder than non-oriented steel and consequently cause fabrication tools and dies to wear more rapidly. The resulting increase in the tooling and manufacturing costs makes fabricating bulk amorphous metal magnetic components using such techniques commercially impractical The thinness of amorphous metals also translates into an increased number of laminations in the assembled components, further increasing the total cost of an amorphous metal rotor or stator magnet assembly.

Amorphous metal is typically supplied in a thin continuous ribbon having a uniform ribbon width. However, amorphous metal is a very hard material, making it very difficult to cut or form easily, and once annealed to achieve peak magnetic properties, becomes very brittle. This makes it difficult and expensive to use conventional approaches to construct a bulk amorphous metal magnetic component. The brittleness of amorphous metal may also cause concern for the durability of the bulk magnetic component in an application such as an electric motor.

Another problem with bulk amorphous metal magnetic components is that the magnetic permeability of amorphous metal material is reduced when it is subjected to physical stresses. This reduced permeability may be considerable depending upon the intensity of the stresses on the amorphous metal material. As a bulk amorphous metal magnetic component is subjected to stresses, the efficiency at which the core directs or focuses magnetic flux is reduced resulting in higher magnetic losses, increased heat production, and reduced power. This stress sensitivity, due to the magnetostrictive nature of the amorphous metal, may be caused by stresses resulting from magnetic and mechanical forces during the operation of the electric motor, mechanical stresses resulting from mechanical clamping or otherwise fixing the bulk amorphous metal magnetic components in place, or internal stresses caused by the thermal expansion and/or expansion due to magnetic saturation of the amorphous metal material.

For certain high speed motors the core losses of typical electrical steels are prohibitive. In such cases a designer may be forced to use a permalloy alloy as an alternative. However, the attendant reduction in saturation induction (e.g. 0.6–0.9T or less for various permalloy alloys versus 1.8–2.0T for ordinary electrical steels) necessitates an increase in the size of magnetic components comprised of permalloy or variants thereof. Furthermore, the desirable soft magnetic properties of the permalloys are adversely and irreversibly affected by plastic deformation which can occur at relatively low stress levels. Such stresses may occur either during manufacture or operation of the permalloy component.

SUMMARY OF THE INVENTION

The present invention provides a low-loss bulk amorphous metal magnetic component having the shape of a polyhedron and being comprised of a plurality of layers of amorphous metal strips for use in highly efficient electric motors. Also provided by the present invention is a method for making a bulk amorphous metal magnetic component. The magnetic component is operable at frequencies ranging from about 50 Hz to 20,000 Hz and exhibits improved performance characteristics when compared to silicon-steel magnetic components operated over the same frequency range. More specifically, a magnetic component constructed in accordance with the present invention and excited at an excitation frequency "f" to a peak induction level "$B_{max}$" will have a core loss at room temperature less than "L" wherein L is given by the formula $L=0.0074 \ f \ (B_{max})^{1.3} + 0.000282 \ f^{1.5} \ (B_{max})^{2.4}$, the core loss, the excitation frequency and the peak induction level being measured in watts per kilogram, hertz, and teslas, respectively. Preferably, the magnetic component will have (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 20 watts-per-kilogram of amorphous metal material when operated at a frequency of approximately 1000 Hz and at a flux density of approximately 1.4 T, or (iii) a core-loss of less than or approximately equal to 70 watt-per-kilogram of amorphous metal material when operated at a frequency of approximately 20,000 Hz and at a flux density of approximately 0.30 T. The reduced core loss of the magnetic component of the invention advantageously improves the efficiency of an electric motor which comprises it.

In a first embodiment of the present invention, a bulk amorphous metal magnetic component comprises a plurality of substantially similarly shaped layers of amorphous metal strips laminated together to form a polyhedrally shaped part.

The present invention also provides a method of constructing a bulk amorphous metal magnetic component. In accordance with a first embodiment of the inventive method, amorphous metal strip material is cut to form a plurality of cut strips having a predetermined length. The cut strips are stacked to form a bar of stacked amorphous metal strip material and annealed to enhance the magnetic properties of the material and, optionally, to transform the initially glassy structure to a nanocrystalline structure. The annealed, stacked bar is impregnated with an epoxy resin and cured. The stacked bar is then cut at predetermined lengths to provide a plurality of polyhedrally shaped magnetic components having a predetermined three-dimensional geometry. The preferred amorphous metal material has a composition defined essentially by the formula $Fe_{80}B_{11}Si_9$.

In accordance with a second embodiment of the method of the present invention, an amorphous metal strip material is wound about a mandrel to form a generally rectangular core having generally radiused corners. The generally rectangular core is then annealed to enhance the magnetic properties of the material and, optionally, to transform the initially glassy structure to a nanocrystalline structure. The core is then impregnated with epoxy resin and cured. The short sides of the rectangular core are then cut to form two magnetic components having a predetermined three-dimensional geometry that is the approximate size and shape of said short sides of said generally rectangular core. The radiused corners are removed from the long sides of said generally rectangular core and the long sides of said generally rectangular core are cut to form a plurality of polyhedrally shaped magnetic components having the predetermined three-dimensional geometry. The preferred amorphous metal material has a composition defined essentially by the formula $Fe_{80}B_{11}Si_9$.

The present invention is also directed to a bulk amorphous metal component constructed in accordance with the above-described methods.

Construction of bulk amorphous metal magnetic components in accordance with the present invention is especially suited for amorphous metal stators or stator components in highly efficient, variable reluctance motors and eddy current motors. Similarly, bulk amorphous metal components may be used as both the rotor and the stator in squirrel cage motors, reluctance synchronous motors and switched reluctance motors. It will be understood by those skilled in the art that such motors may comprise one or more rotors and one or more stators. Accordingly, the terms "a rotor" and "a stator" as used herein with reference to motors mean a number of rotors and stators ranging from 1 to as many as three or more. It will also be recognized by those skilled in the art that the term "electric motor", as used herein, refers generically to a variety of rotating electrical machines which additionally comprise electric generators as well as regenerative motors that may be operated optionally as electric generators. The magnetic component of the invention may be employed in constructing any of these devices. The advantages recognized by the present invention include simplified manufacturing and reduced manufacturing time, reduced stresses (i.e., magnetostrictive) encountered during construction of bulk amorphous metal components, and optimized performance of the finished amorphous metal magnetic component.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DETAILED DESCRIPTION OF THE PREFERRED EMBODIMENTS

The present invention is directed to high efficiency motors constructed using low-loss bulk amorphous metal components such as, for example stators, rotors, and component parts for stators and rotors. Generally polyhedrally shaped bulk amorphous metal components are constructed in accordance with the present invention having various geometries including, but not limited to, rectangular, square, prism. In addition, any of the previously mentioned geometric shapes may include at least one arcuate surface, and preferably two oppositely disposed arcuate surfaces to form a generally curved or arcuate bulk amorphous metal component. Furthermore, complete stators and rotors may be constructed as bulk amorphous metal components in accordance with the present invention. Those stators and rotors may have either a unitary construction or they may be formed from a plurality of pieces which collectively form the completed component. Alternatively, a stator and/or rotor may be a composite structure comprised entirely of amorphous metal parts or a combination of amorphous metal parts with other magnetic materials.

Figure 1:
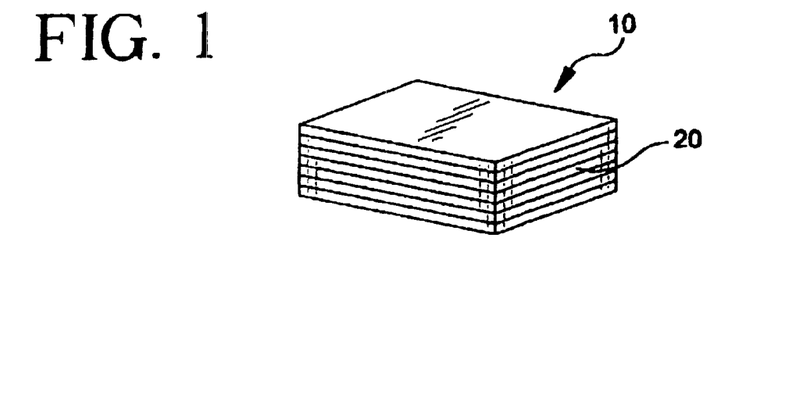
FIG. 1 is a perspective view of a bulk amorphous metal magnetic component in the shape of a three-dimensional rectangle constructed in accordance with the present invention.

Referring now to the drawings in detail, FIG. 1 depicts a generally polyhedrally shaped bulk amorphous metal component 10. As used herein, the term polyhedron refers to a multi-faced or sided solid. This includes, but is not limited to, three-dimensional rectangles, squares, trapezoids, and prisms. In addition, any of the previously mentioned geometric shapes may include at least one, and preferably two, arcuate surface or sides that are disposed opposite each other to form a generally arcuately shaped component. The magnetic component 10 depicted in FIG. 1 is comprised of a plurality of substantially similarly shaped layers of amorphous metal strip material 20 that are laminated together and annealed. A three-dimensional magnetic component 10 constructed in accordance with the present invention and excited at an excitation frequency "f" to a peak induction level "$B_{max}$" will have a core loss at room temperature less than "L" wherein L is given by the formula L=0.0074 f $(B_{max})^{1.3}$+0.000282 $f^{1.5}$ $(B_{max})^{2.4}$, the core loss, the excitation frequency and the peak induction level being measured in watts per kilogram, hertz, and teslas, respectively. In a preferred embodiment, the magnetic component has (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 20 watts-per-kilogram of amorphous metal material when operated at a frequency of approximately 1000 Hz and at a flux density of approximately 1.4 T, or (iii) a core-loss of less than or approximately equal to 70 watt-per-kilogram of amorphous metal material when operated at a frequency of approximately 20,000 Hz and at a flux density of approximately 0.30 T. The reduced core loss of the component of the invention advantageously improves the efficiency of an electric motor comprising it. The low values of core loss make the bulk magnetic component of the invention especially Suited for use in motors wherein a high pole count or a high rotational speed necessitates a high frequency magnetic excitation, e.g., excitation at above 100 Hz. The inherent high core loss of conventional steels at high frequency renders them unsuitable for use in such motors requiring high frequency excitation. These core loss performance values apply to the various embodiments of the present invention, regardless of the specific geometry of the bulk amorphous metal component.

Figure 2A:
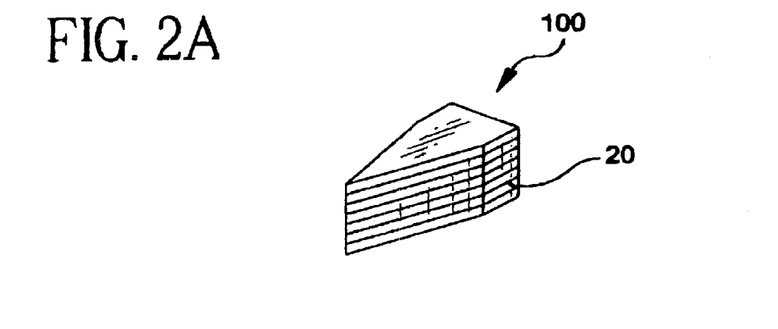
FIG. 2A is a perspective view of a bulk amorphous metal magnetic component having the shape of a prism and constructed in accordance with the present invention.

The magnetic component 100 depicted in FIG. 2A is generally prism-shaped and preferably includes five (5) sides 110 or surfaces. The pentagonally-shaped polyhedron component 100 is comprised of a plurality of layers of amorphous metal strip material 20 that are each substantially the same size and shape. The strip material 20 is stacked, laminated together and then annealed.

Figure 2B:
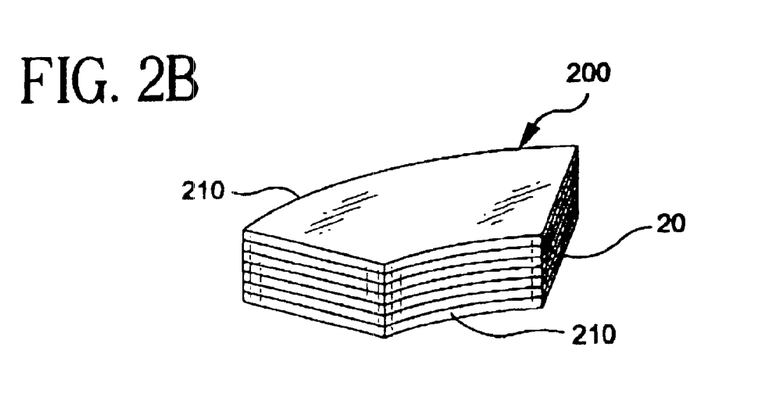
FIG. 2B is a perspective view of a bulk amorphous metal magnetic component having oppositely disposed arcuate surfaces and constructed in accordance with the present invention.

The magnetic component 200 depicted in FIG. 2B includes at least one, and preferably two oppositely disposed arcuate surfaces 210. The arcuately-shaped component 200 is comprised of a plurality of layers of amorphous metal strip material 20 that are each substantially the same size and shape and that are stacked, laminated together, and annealed.

Figure 2C:
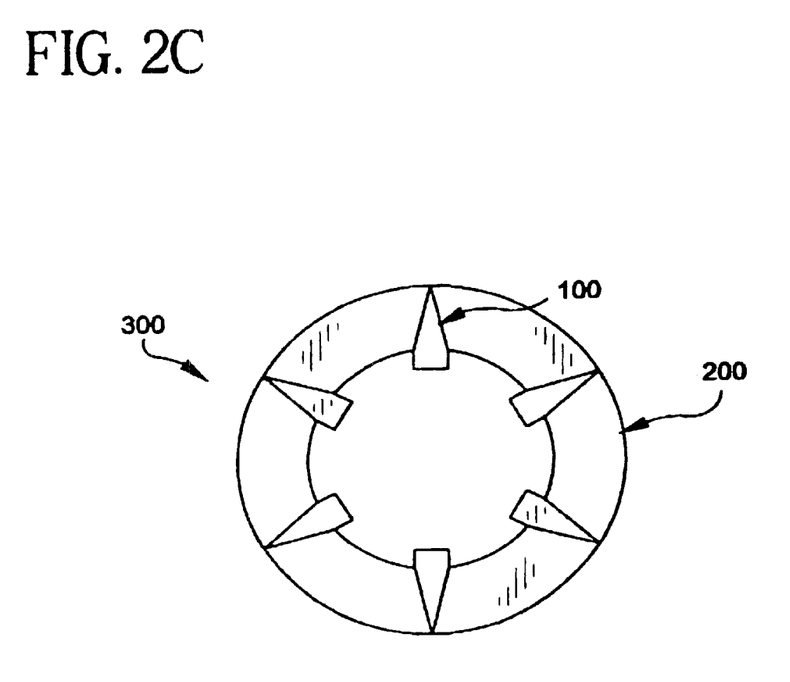
FIG. 2C is a top view of a stator for an electric motor constructed from six prism-shaped components as depicted in FIG. 2A and six arcuate components as depicted in FIG. 2B.

The bulk amorphous metal magnetic component 300 depicted in FIG. 2C may be used as a stator for a radial gap electric motor and is comprised of six pieces of magnetic component 100 and six pieces of magnetic component 200.

Figure 3A:
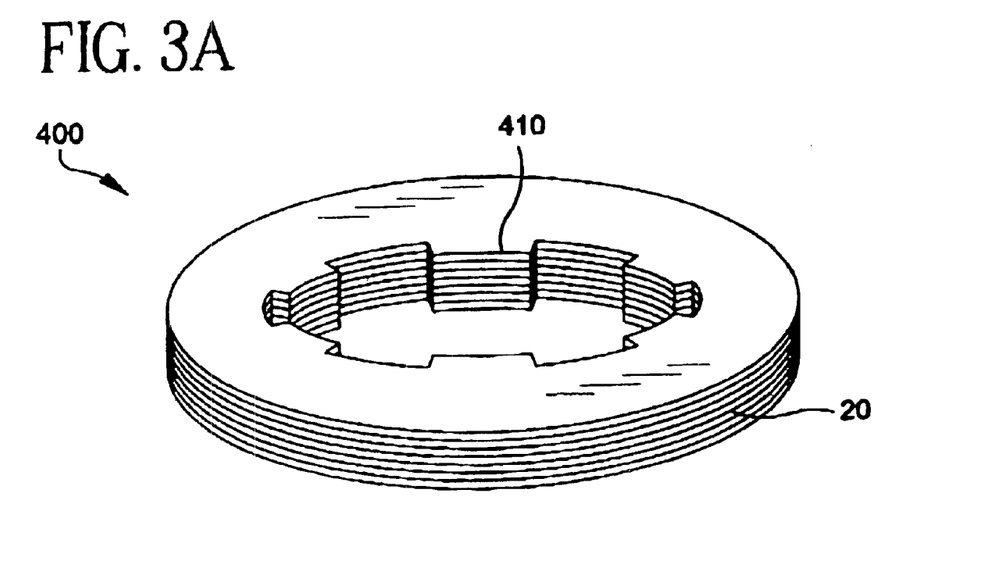
FIG. 3A is a perspective view of a bulk amorphous metal magnetic stator for an electric motor constructed in accordance with the present invention.

The bulk amorphous metal magnetic component 400 depicted in FIG. 3A is generally circular and includes a plurality of generally rectangular teeth 410 that extend radially inward toward the center of the circular component 400. The component 400 is comprised of a plurality of layers of amorphous metal strip material 20 that are each substantially the same size and shape and that are stacked, laminated together, and then annealed. A bulk amorphous metal component constructed in accordance with the embodiment of FIG. 3A may be used as a stator in a radial air gap electric motor.

Figure 3B:
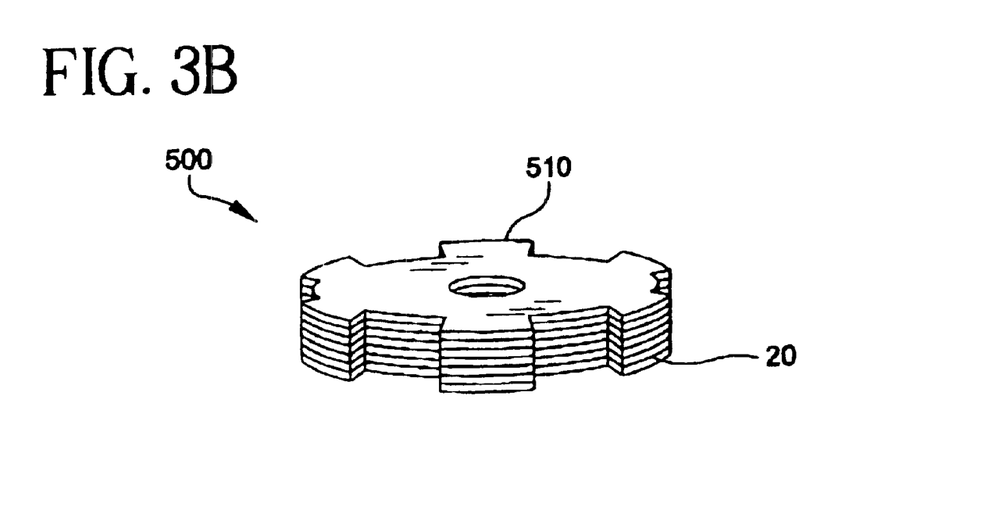
FIG. 3B is a perspective view of a bulk amorphous metal magnetic rotor for an electric motor constructed in accordance with the present invention.

The bulk amorphous metal component 500 depicted in FIG. 3B is generally disc-shaped and includes a plurality of generally rectangular teeth 510 that extend radially outward. The component 500 is comprised of a plurality of layers of amorphous metal strip material 20 that are each substantially the same size and shape and that are stacked, laminated together, and then annealed. A bulk amorphous metal component constructed in accordance with the embodiment of FIG. 3B may be used as a rotor in a radial air gap electric motor.

Figure 3C:
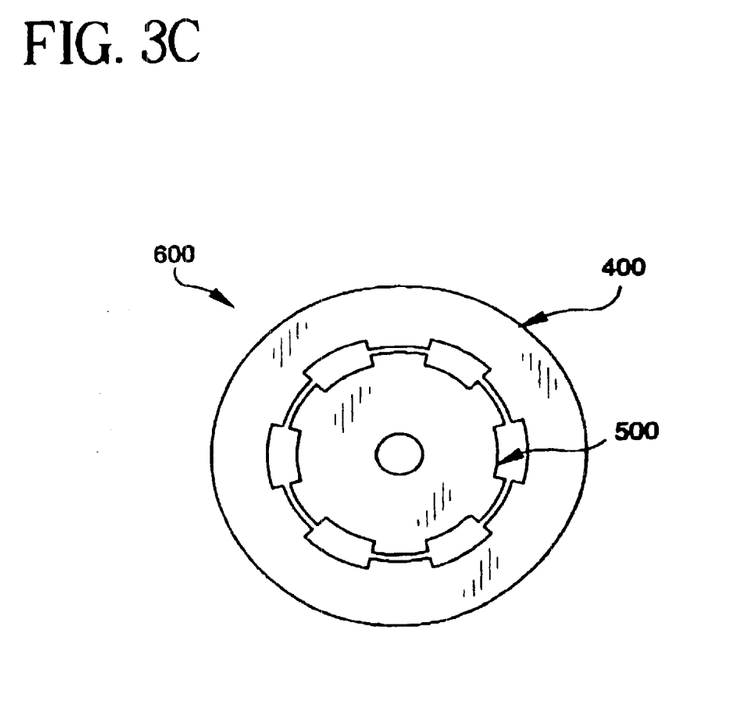
FIG. 3C is a top view of the stator and rotor for an electric motor constructed from the stator of FIG. 3A and the rotor of FIG. 3B.

Referring next to FIG. 3C, a stator 400 and rotor 500 are constructed as bulk amorphous metal components in accordance with the present invention and used as part of a high efficiency radial air gap electric motor 600.

Figure 4:
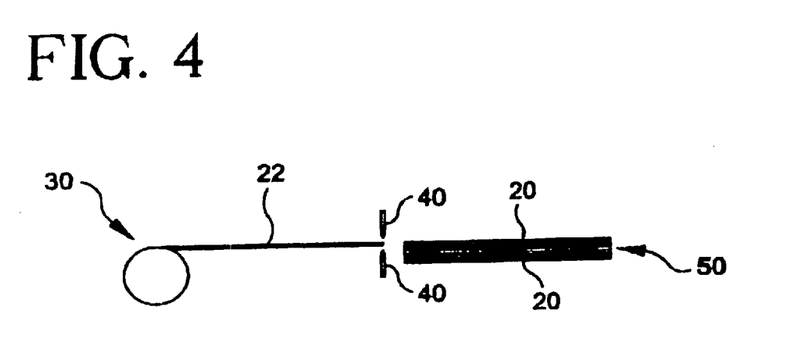
FIG. 4 is a side view of a coil of amorphous metal strip positioned to be cut and stacked in accordance with the present invention.
Figure 5:
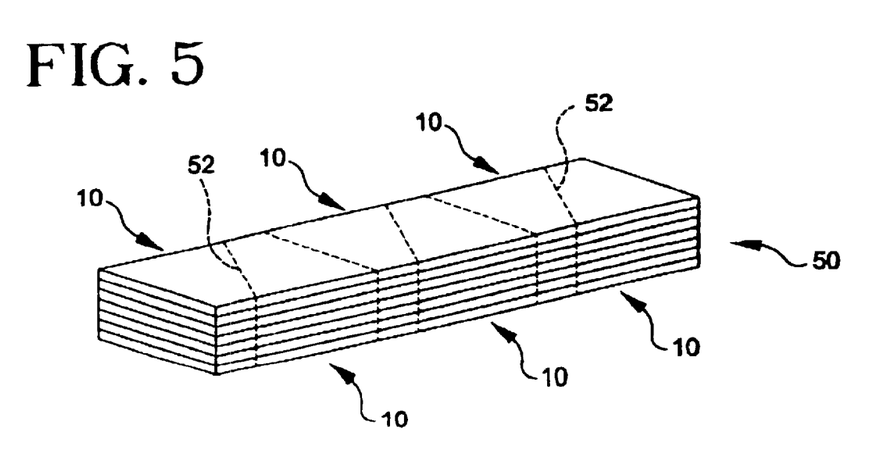
FIG. 5 is a perspective view of a bar of amorphous metal strips showing the cut lines to produce a plurality of generally prism-shaped magnetic components in accordance with the present invention.

The present invention also provides a method of constructing a bulk amorphous metal component. As shown in FIG. 4, a roll 30 of amorphous metal strip material is cut by cutting blades 40 into a plurality of strips 20 having the same shape and size. The strips 20 are stacked to form a bar 50 of stacked amorphous metal strip material. The bar 50 is annealed, impregnated with an epoxy resin and cured. The bar 50 can be cut along the lines 52 depicted in FIG. 5 to produce a plurality of generally trapezoidally-shaped magnetic components 10. The finished magnetic component 10 may be generally rectangular, trapezoidal, square, or other polyhedral shape. The bar 50 may also be cut to produce three dimensional shapes in the form of pentagonal prisms 11, arc-shaped blocks 12, circular-shaped blocks 13 or disc-shaped blocks 14, as shown in FIGS. 2A, 2B, 3A and 3B respectively.

Figure 6:
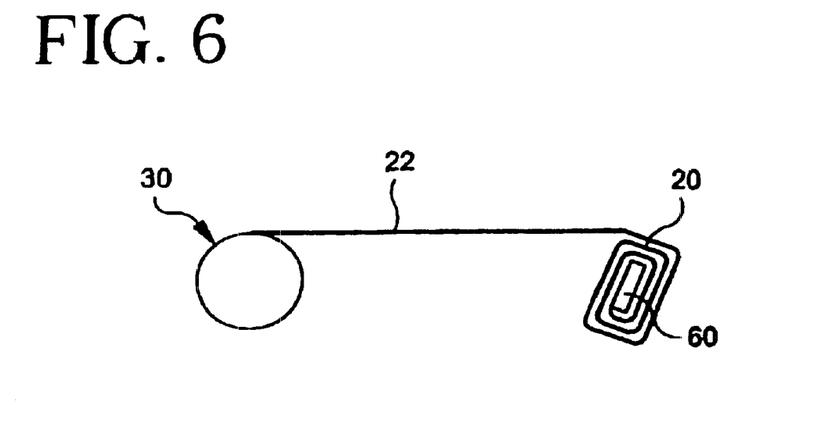
FIG. 6 is a side view of a coil of amorphous metal strip which is being wound about a mandrel to form a generally rectangular core in accordance with the present invention.
Figure 7:
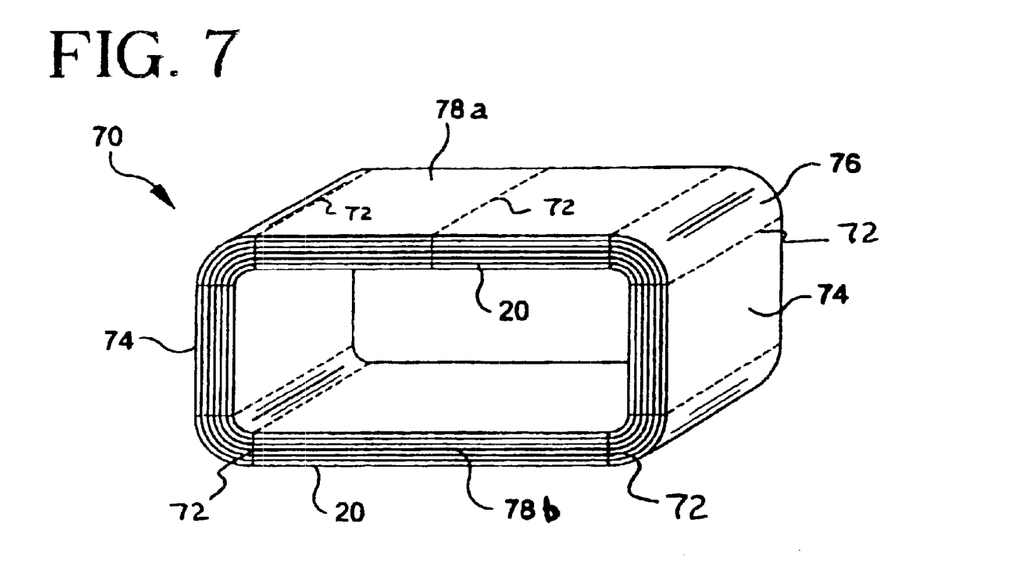
FIG. 7 is a perspective view of a generally rectangular amorphous metal core showing the cut lines to produce a plurality of generally prism-shaped magnetic components formed in accordance with the present invention.

In a second embodiment of the method of the present invention, shown in FIGS. 6 and 7, a bulk amorphous metal magnetic component 10 is formed by winding a single amorphous metal strip 22 or a group of amorphous metal strips 22 around a generally rectangular mandrel 60 to form a generally rectangular wound core 70. The height of the short sides 74 of the core 70 is preferably approximately equal to the desired length of the finished bulk amorphous metal magnetic component 10. The core 70 is annealed, impregnated with an epoxy resin and cured. Two components 10 may be formed by cutting the short sides 74, leaving the radiused corners 76 on the long sides 78a and 78b. Additional magnetic components 10 may be formed by removing the radiused corners 76 from the long sides 78a and 78b, and cutting the long sides 78a and 78b at a plurality of locations, indicated by the dashed lines 72. In the example illustrated in FIG. 7, the bulk amorphous metal component 10 has a generally rectangular shape, although other shapes are contemplated by the present invention. The wound core 70 may also be cut to produce three dimensional shapes in the form of pentagonal prisms 11, arc-shaped blocks 12, circular-shaped blocks 13 or disc-shaped blocks 14, as shown in FIGS. 2A, 2B, 3A and 3B respectively.

Construction in this manner is especially suited for magnetic components such as amorphous metal stator and rotor assemblies in electric motors. Magnetic component manufacturing is simplified and manufacturing time is reduced. Stresses otherwise encountered during the construction of bulk amorphous metal components are minimized. Magnetic performance of the finished components is optimized.

The bulk amorphous metal magnetic component 10 of the present invention can be manufactured using numerous amorphous metal alloys. Generally stated, the alloys suitable for use in the component 10 construction of the present invention are defined by the formula: $M_{70-85}$ $Y_{5-20}$ $Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta and W, and (ii) up to ten (10) atom percent of components (Y+Z) can be replaced by at least one of the non-metallic species In, Sn, Sb and Pb. As used herein, the term "amorphous metallic alloy" means a metallic alloy that substantially lacks any long range order and is characterized by X-ray diffraction intensity maxima which are qualitatively similar to those observed for liquids or inorganic oxide glasses.

Amorphous metal alloys suitable for the practice of the invention are commercially available, generally in the form of continuous thin strip or ribbon in widths up to 20 cm or more and in thicknesses of approximately 20–25 $\mu$m. These alloys are formed with a substantially fully glassy microstructure (e.g., at least about 80% by volume of material having a non-crystalline structure). Preferably the alloys are formed with essentially 100% of the material having a non-crystalline structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M" is iron, "Y" is boron and "Z" is silicon. For this reason, amorphous metal strip composed of an iron-boron-silicon alloy is preferred. Most preferred is amorphous metal strip having a composition consisting essentially of about 11 atom percent boron and about 9 atom percent silicon, the balance being iron and incidental impurities. This strip is sold by Honeywell International Inc. under the trade designation METLAS® alloy 2605SA-1.

The magnetic properties of the amorphous metal strip appointed for use in component 10 of the present invention may be enhanced by thermal treatment at a temperature and for a time sufficient to provide the requisite enhancement without altering the substantially fully glassy microstructure of the strip. A magnetic field may optionally be applied to the strip during at least a portion, and preferably during at least the cooling portion, of the heat treatment.

The magnetic properties of certain amorphous alloys suitable for use in component 10 may be significantly improved by heat treating the alloy to form a nanocrystalline microstructure. This microstructure is characterized by the presence of a high density of grains having average size less than about 100 nm, preferably less than 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of the motor. The heat treatment needed to produce the nanocrystalline structure in a given alloy must be carried out at a higher temperature or for a longer time than would be needed for a heat treatment designed to preserve therein a substantially fully glassy microstructure. As used herein the terms amorphous metal and amorphous alloy further include a material initially formed with a substantially fully glassy microstructure and subsequently transformed by heat treatment or other processing to a material having a nanocrystalline microstructure. Amorphous alloys which may be heat treated to form a nanocrystalline microstructure are also often termed, simply, nanocrystalline alloys. The present method allows a nanocrystalline alloy to be formed into the requisite geometrical shape of the finished bulk magnetic component. Such formation is advantageously accomplished while the alloy is still in its as-cast, ductile, substantially non-crystalline form; before it is heat treated to form the nanocrystalline structure which generally renders it more brittle and more difficult to handle.

Two preferred classes of alloy having magnetic properties significantly enhanced by formation therein of a nanocrystalline microstructure are given by the following formulas in which the subscripts are in atom percent.

A first preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8. After this alloy is heat treated to form a nanocrystalline microstructure therein, it has high saturation induction (e.g., at least about 1.5 T), low core loss, and low saturation magnetostriction (e.g. a magnetostriction having an absolute value less than $4\times10^{-6}$). Such an alloy is especially preferred for applications wherein a motor of minimum size for the required power and torque is demanded.

A second preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18. After this alloy is heat treated to form a nanocrystalline microstructure therein, it has a saturation induction of at least about 1.0 T, an especially low core loss, and low saturation magnetostriction (e.g. a magnetostriction having an absolute value less than $4\times10^{-6}$). Such an alloy is especially preferred for use in a motor required to operate at very high speed (e.g., requiring an excitation frequency of 1000 Hz or more).

The bulk amorphous metal magnetic component 10 of the present invention can be cut from bars 50 of stacked amorphous metal strip or from cores 70 of wound amorphous metal strip using numerous cutting technologies. The component 10 may be cut from the bar 50 or core 70 using a cutting blade or wheel. Alternately, the component 10 may be cut by electro-discharge machining or with a water jet. Bulk amorphous magnetic components will magnetize and demagnetize more efficiently than components made from other iron-base magnetic metals. When used as the rotor or stator in an electric motor, the bulk amorphous metal component will generate less heat than a comparable component made from another iron-base magnetic metal when the two components are magnetized at identical induction and frequency. The electric motor using the bulk amorphous metal component can therefore be designed to operate 1) at a lower operating temperature; 2) at higher induction to achieve reduced size and weight; or, 3) at higher frequency to achieve reduced size and weight, or to achieve superior motion control, when compared to electric motors using components made from other iron-base magnetic metals.

As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement the excitation is generally chosen such that the magnetic induction varies sinusoidally with time at a frequency "f"

and with a peak amplitude $B_{max}$. The core loss is then determined by known electrical measurement instrumentation and techniques. Loss is conventionally reported as watts per unit mass or volume of the magnetic material being excited. It is known in the art that loss increases monotonically with f and $B_{max}$. Most standard protocols for testing the core loss of soft magnetic materials used in components of motors {e.g. ASTM Standards A912–93 and A927 (A927M-94)} call for a sample of such materials which is situated in a substantially closed magnetic circuit, i.e. a configuration in which closed magnetic flux lines are completely contained within the volume of the sample. On the other hand, a magnetic material as employed in a motor component such as a rotor or a stator is situated in a magnetically open circuit, i.e. a configuration in which magnetic flux lines must traverse an air gap. Because of fringing field effects and non-uniformity of the field, a given material tested in an open circuit generally exhibits a higher core loss, i.e. a higher value of watts per unit mass or volume, than it would have in a closed-circuit measurement. The bulk magnetic component of the invention advantageously exhibits low core loss over a wide range of flux densities and frequencies even in an open-circuit configuration.

Without being bound by any theory, it is believed that the total core loss of the low-loss bulk amorphous metal component of the invention is comprised of contributions from hysteresis losses and eddy current losses. Each of these two contributions is a function of the peak magnetic induction $B_{max}$ and of the excitation frequency f. Prior art analyses of core losses in amorphous metals (see, e.g., G. E. Fish, J. Appl. Phys. 57, 3569(1985) and G. E. Fish et al., J. Appl. Phys. 64, 5370(1988)) have generally been restricted to data obtained for material in a closed magnetic circuit.

The total core loss $L(B_{max}, f)$ per unit mass of the bulk magnetic component of the invention may be essentially defined by a function having the form $$L(B_{max}, f) = c_1 f(B_{max})^n + c_2 f^q(B_{max})^m$$

wherein the coefficients $c_1$ and $c_2$ and the exponents n, m, and q must all be determined empirically, there being no known theory that precisely determines their values. Use of this formula allows the total core loss of the bulk magnetic component of the invention to be determined at any required operating induction and excitation frequency. It is generally found that in the particular geometry of a motor rotor or stator the magnetic field therein is not spatially uniform. Techniques such as finite element modeling arc known in the art to provide an estimate of the spatial and temporal variation of the peak flux density that closely approximates the flux density distribution measured in an actual motor or generator. Using as input a suitable empirical formula giving the magnetic core loss of a given material under spatially uniform flux density these techniques allow the corresponding actual core loss of a given component in its operating configuration to be predicted with reasonable accuracy.

The measurement of the core loss of the magnetic component of the invention can be carried out using various methods known in the art. A method especially suited for measuring the present component may be described as follows. The method comprises forming a magnetic circuit with the magnetic component of the invention and a flux closure structure means. Optionally the magnetic circuit may comprise a plurality of magnetic components of the invention and a flux closure structure means. The flux closure structure means preferably comprises soft magnetic material having high permeability and a saturation flux density at least equal to the flux density at which the component is to be tested. Preferably, the soft magnetic material has a saturation flux density at least equal to the saturation flux density of the component. The flux direction along which the component is to be tested generally defines first and second opposite faces of the component. Flux lines enter the component in a direction generally normal to the plane of the first opposite face. The flux lines generally follow the plane of the amorphous metal strips, and emerge from the second opposing face. The flux closure structure means generally comprises a flux closure magnetic component which is constructed preferably in accordance with the present invention but may also be made with other methods and materials known in the art. The flux closure magnetic component also has first and second opposing faces through which flux lines enter and emerge, generally normal to the respective planes thereof. The flux closure component opposing faces are substantially the same size and shape to the respective faces of the magnetic component to which the flux closure component is mated during actual testing. The flux closure magnetic component is placed in mating relationship with its first and second faces closely proximate and substantially proximate to the first and second faces of the magnetic component of the invention, respectively. Magnetomotive force is applied by passing current through a first winding encircling either the magnetic component of the invention or the flux closure magnetic component. The resulting flux density is determined by Faraday's law from the voltage induced in a second winding encircling the magnetic component to be tested. The applied magnetic field is determined by Ampere's law from the magnetomotive force. The core loss is then computed from the applied magnetic field and the resulting flux density by conventional methods.

Referring to FIG. 7, there is illustrated a testing method suitable for determining the core loss of magnetic component 10. Long side 78b of core 70 is appointed as magnetic component 10 for core loss testing. The remainder of core 70 serves as the flux closure structure means, which is generally C-shaped and comprises the four generally radiused corners 76, short sides 74 and long side 78a. Each of the cuts 72 which separate the radiused corners 76, the short sides 74, and long side 78a is optional. Preferably, only the cuts separating long side 78b from the remainder of core 70 are made. Cut surfaces formed by cutting core 70 to remove long side 78b define the opposite faces of the magnetic component and the opposite faces of the flux closure magnetic component. For testing, long side 78b is is situated with its faces closely proximate and parallel to the corresponding faces defined by the cuts. The faces of long side 78b are substantially the same in size and shape as the faces of the flux closure magnetic component. Two copper wire windings (not shown) encircle long side 78b. An alternating current of suitable magnitude is passed through the first winding to provide a magnetomotive force that excites long side 78b at the requisite frequency and peak flux density. Flux lines in long side 78b and the flux closure magnetic component are generally within the plane of strips 22 and directed circumferentially. Voltage indicative of the time varying flux density within long side 78b is induced in the second winding. Core loss is determined by conventional electronic means from the measured values of voltage and current.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Preparation And Electro-Magnetic Testing of an Amorphous Metal Rectangular Prism $Fe_{80}B_{11}Si_9$ amorphous metal ribbon, approximately 60 mm wide and 0.022 mm thick, was wrapped around a rectangular mandrel or bobbin having dimensions of approximately 25 mm by 90 mm. Approximately 800 wraps of amorphous metal ribbon were wound around the mandrel or bobbin producing a rectangular core form having inner dimensions of approximately 25 mm by 90 mm and a build thickness of approximately 20 mm. The core/bobbin assembly was annealed in a nitrogen atmosphere. The anneal consisted of: 1) heating the assembly up to 365° C.; 2) holding the temperature at approximately 365° C. for approximately 2 hours; and, 3) cooling the assembly to ambient temperature. The rectangular, wound, amorphous metal core was removed from the core/bobbin assembly. The core was vacuum impregnated with an epoxy resin solution. The bobbin was replaced, and the rebuilt, impregnated core/bobbin assembly was cured at 120° C. for approximately 4.5 hours. When fully cured, the core was again removed from the core/bobbin assembly. The resulting rectangular, wound, epoxy bonded, amorphous metal core weighed approximately 2100 g.

A rectangular prism 60 mm long by 40 mm wide by 20 mm thick (approximately 800 layers) was cut from the epoxy bonded amorphous metal core with a 1.5 mm thick cutting blade. The cut surfaces of the rectangular prism and the remaining section of the core were etched in a nitric acid/water solution and cleaned in an ammonium hydroxide/water solution.

The remaining section of the core was etched in a nitric acid/water solution and cleaned in an ammonium hydroxide/water solution. The rectangular prism and the remaining section of the core were then reassembled into a full, cut core form. Primary and secondary electrical windings were fixed to the remaining section of the core. The cut core form was electrically tested at room temperature at 60 Hz, 1,000 Hz, 5,000 Hz and 20,000 Hz and compared to catalogue values for other ferromagnetic materials in similar test configurations [National Arnold Magnetics, 17030 Muskrat Avenue, Adelanto, CA 92301 (1995)]. The results are compiled below in Tables 1, 2, 3 and 4.

TABLE 1

Core Loss @ 60 Hz (W/kg)

| | Material | | | | |
|---|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
| 0.3 T | 0.10 | 0.2 | 0.1 | 0.1 | 0.06 |
| 0.7 T | 0.33 | 0.9 | 0.5 | 0.4 | 0.3 |
| 0.8 T | | 1.2 | 0.7 | 0.6 | 0.4 |
| 1.0 T | | 1.9 | 1.0 | 0.8 | 0.6 |
| 1.1 T | 0.59 | | | | |
| 1.2 T | | 2.6 | 1.5 | 1.1 | 0.8 |
| 1.3 T | 0.75 | | | | |
| 1.4 T | 0.85 | 3.3 | 1.9 | 1.5 | 1.1 |

TABLE 2

Core Loss @ 1,000 Hz (W/kg)

| | Material | | | | |
|---|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
| 0.3 T | 1.92 | 2.4 | 2.0 | 3.4 | 5.0 |
| 0.5 T | 4.27 | 6.6 | 5.5 | 8.8 | 12 |
| 0.7 T | 6.94 | 13 | 9.0 | 18 | 24 |
| 0.9 T | 9.92 | 20 | 17 | 28 | 41 |
| 1.0 T | 11.51 | 24 | 20 | 31 | 46 |
| 1.1 T | 13.46 | | | | |
| 1.2 T | 15.77 | 33 | 28 | | |
| 1.3 T | 17.53 | | | | |
| 1.4 T | 19.67 | 44 | 35 | | |

TABLE 3

Core Loss @ 5,000 Hz (W/kg)

| | Material | | | |
|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
| 0.04 T | 0.25 | 0.33 | 0.33 | 1.3 |
| 0.06 T | 0.52 | 0.83 | 0.80 | 2.5 |
| 0.08 T | 0.88 | 1.4 | 1.7 | 4.4 |
| 0.10 T | 1.35 | 2.2 | 2.1 | 6.6 |
| 0.20 T | 5 | 8.8 | 8.6 | 24 |
| 0.30 T | 10 | 18.7 | 18.7 | 48 |

TABLE 4

Core Loss @ 20,000 Hz (W/kg)

| | Material | | | |
|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
| 0.04 T | 1.8 | 2.4 | 2.8 | 16 |
| 0.06 T | 3.7 | 5.5 | 7.0 | 33 |
| 0.08 T | 6.1 | 9.9 | 1.2 | 53 |
| 0.10 T | 9.2 | 15 | 20 | 88 |
| 0.20 T | 35 | 57 | 82 | |
| 0.30 T | 70 | 130 | | |

As shown by the data in Table 3 and 4, the core loss is particularly low at excitation frequencies of 5000 Hz or more. Thus, the magnetic component of the invention is especially suited for use in high-speed motors.

EXAMPLE 2

Preparation of an Amorphous Metal Trapezoidal Prism $Fe_{80}B_{11}Si_9$ amorphous metal ribbon, approximately 48 mm wide and 0.022 mm thick, was cut into lengths of approximately 300 mm. Approximately 3,800 layers of the cut amorphous metal ribbon were stacked to form a bar approximately 48 mm wide and 300 mm long, with a build thickness of approximately 96 mm. The bar was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The bar was vacuum impregnated with an epoxy resin solution and cured at 120° C. for approximately 4.5 hours. The resulting stacked, epoxy bonded, amorphous metal bar weighed approximately 9000 g.

A trapezoidal prism was cut from the stacked, epoxy bonded amorphous 15 metal bar with a 1.5 mm thick cutting blade. The trapezoid-shaped face of the prism had bases of 52 and 62 mm and height of 48 mm. The trapezoidal prism was 96 mm (3,800 layers) thick. The cut surfaces of the trapezoidal prism and the remaining section of the core were etched in a nitric acid/water solution and cleaned in an ammonium hydroxide/water solution.

The trapezoidal prism has a core loss of less than 11.5 W/kg when excited at 1000 Fliz to a peak induction level of 1.0 T.

EXAMPLE 3

Preparation of Polygonal, Bulk Amorphous Metal Components With Arc-Shaped Cross-Sections $Fe_{80}B_{11}Si_9$ amorphous metal ribbon, approximately 50 mm wide and 0.022 mm thick, was cut into lengths of approximately 300 mm. Approximately 3,800 layers of the cut amorphous metal ribbon were stacked to form a bar approximately 50 mm wide and 300 mm long, with a build thickness of approximately 96 mm. The bar was annealed in a nitrogen atmosphere. The anneal consisted of: 1) heating the bar up to 365° C.; 2) holding the temperature at approximately. 365° C. for approximately 2 hours; and, 3) cooling the bar to ambient temperature. The bar was vacuum impregnated with an epoxy resin solution and cured at 120° C. for approximately 4.5 hours. The resulting stacked, epoxy bonded, amorphous metal bar weighed approximately 9200 g.

The stacked, epoxy bonded, amorphous metal bar was cut using electro-discharge machining to form a three-dimensional, arc-shaped block. The outer diameter of the block was approximately 96 mm. The inner diameter of the block was approximately 13 mm. The arc length was approximately 90°. The block thickness was approximately 96 mm.

$Fe_{80}B_{11}Si_9$ amorphous metal ribbon, approximately 20 mm wide and 0.022 mm thick, was wrapped around a circular mandrel or bobbin having an outer diameter of approximately 19 mm. Approximately 1,200 wraps of amorphous metal ribbon were wound around the mandrel or bobbin producing a circular core form having an inner diameter of approximately 19 mm and an outer diameter of approximately 48 mm. The core had a build thickness of approximately 29 mm. The core was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The core was vacuum impregnated with an epoxy resin solution and cured at 120° C. for approximately 4.5 hours. The resulting wound, epoxy bonded, amorphous metal core weighed approximately 71 g.

The wound, epoxy bonded, amorphous metal core was cut using a water jet to form a semi-circular, three-dimensional shaped object. The semi-circular object had an inner diameter of approximately 19 mm, an outer diameter of approximately 48 mm, and a thickness of approximately 20 mm.

The cut surfaces of the polygonal bulk amorphous metal components were etched in a nitric acid/water solution and cleaned in an ammonium hydroxide/water solution.

Each of the polygonal bulk amorphous metal components has a core loss of less than 11.5 W/kg when excited at 1000 Hz to a peak induction level of 1.0 T.

EXAMPLE 4

High Frequency Behavior of Low-Loss Bulk Amorphous Metal Components

The core loss data taken in Example 1 above were analyzed using conventional non-linear regression methods. It was determined that the core loss of a low-loss bulk amorphous metal component comprised of $Fe_{80}B_{11}Si_9$ amorphous metal ribbon could be essentially defined by a function having the form $$L(B_{max}, f) = c_1 f(B_{max})^n + c_2 f^q (B_{max})^m.$$

Suitable values of the coefficients $c_1$ and $c_2$ and the exponents n, m, and q were selected to define an upper bound to the magnetic losses of the bulk amorphous metal component. Table 5 recites the measured losses of the component in Example 1 and the losses predicted by the above formula, each measured in watts per kilogram. The predicted losses as a function of f (Hz) and $B_{max}$ (Tesla) were calculated using the coefficients $c_1$=0.0074 and $c_2$=0.000282 and the exponents n=1.3, m=2.4, and q=1.5. The measured loss of the bulk amorphous metal component of Example 1 was less than the corresponding loss predicted by the formula.

TABLE 5

| Point | $B_{max}$ (Tesla) | Frequency (Hz) | Measured Core Loss (W/kg) | Predicted Core Loss (W/kg) |
|---|---|---|---|---|
| 1 | 0.3 | 60 | 0.1 | 0.10 |
| 2 | 0.7 | 60 | 0.33 | 0.33 |
| 3 | 1.1 | 60 | 0.59 | 0.67 |
| 4 | 1.3 | 60 | 0.75 | 0.87 |
| 5 | 1.4 | 60 | 0.85 | 0.98 |
| 6 | 0.3 | 1000 | 1.92 | 2.04 |
| 7 | 0.5 | 1000 | 4.27 | 4.69 |
| 8 | 0.7 | 1000 | 6.94 | 8.44 |
| 9 | 0.9 | 1000 | 9.92 | 13.38 |
| 10 | 1 | 1000 | 11.51 | 16.32 |
| 11 | 1.1 | 1000 | 13.46 | 19.59 |
| 12 | 1.2 | 1000 | 15.77 | 23.19 |
| 13 | 1.3 | 1000 | 17.53 | 27.15 |
| 14 | 1.4 | 1000 | 19.67 | 31.46 |
| 15 | 0.04 | 5000 | 0.25 | 0.61 |
| 16 | 0.06 | 5000 | 0.52 | 1.07 |
| 17 | 0.08 | 5000 | 0.88 | 1.62 |
| 18 | 0.1 | 5000 | 1.35 | 2.25 |
| 19 | 0.2 | 5000 | 5 | 6.66 |
| 20 | 0.3 | 5000 | 10 | 13.28 |
| 21 | 0.04 | 20000 | 1.8 | 2.61 |
| 22 | 0.06 | 20000 | 3.7 | 4.75 |
| 23 | 0.08 | 20000 | 6.1 | 7.41 |
| 24 | 0.1 | 20000 | 9.2 | 10.59 |
| 25 | 0.2 | 20000 | 35 | 35.02 |
| 26 | 0.3 | 20000 | 70 | 75.29 |

EXAMPLE 5

Preparation of a Nanocrystalline Alloy Rectangular Prism $Fe_{73.5}Cu_1Nb_3B_9Si_{13.5}$ amorphous metal ribbon, approximately 25 mm wide and 0.018 mm thick, is cut into lengths of approximately 300 mm. Approximately 1,200 layers of the cut amorphous metal ribbon are stacked to form a bar approximately 25 mm wide and 300 mm long, with a build thickness of approximately 25 mm. The bar is annealed in a nitrogen atmosphere. The anneal is carried out by performing the following steps: 1) heating the bar up to 580° C.; 2) holding the temperature at approximately 580° C. for approximately 1 hour; and, 3) cooling the bar to ambient temperature. The bar is vacuum impregnated with an epoxy resin solution and cured at 120° C. for approximately 4.5 hours. The resulting stacked, epoxy bonded, amorphous metal bar weighs approximately 1200 g.

A rectangular prism is cut from the stacked, epoxy bonded amorphous metal bar with a 1.5 mm thick cutting blade. The face of the prism is approximately 25 mm square with a length of 50 mm. The rectangular prism is 25 mm (1200 layers) thick. The cut surfaces of the rectangular prism are etched in a nitric acid/water solution and cleaned in an ammonium hydroxide/water solution.

The rectangular prism has a core loss of less than 11.5 W/kg when excited at 1000 Hz to a peak induction level of 1.0 T.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A method of constructing a low core loss bulk amorphous metal magnetic component for use in an electric motor comprising, in sequence, the steps of:

(a) cutting amorphous metal strip material to form a plurality of cut strips having a predetermined length;

(b) stacking said cut strips to form a bar of stacked amorphous metal strip material;

(c) annealing said stacked bar;

(d) impregnating said stacked bar with an epoxy resin and curing said resin impregnated stacked bar; and (e) cutting said stacked bar at predetermined lengths to provide a plurality of polyhedrally shaped magnetic components having a predetermined three-imensional geometry, wherein said component has a core loss less than "L" wherein L is given by the formula $L=0.0074\ f\ (B_{max})^{1.3}+0.000282\ f^{1.5}\ (B_{max})^{2.4}$, the core loss, the excitation frequency and the peak induction level being measured in watts per kilogram hertz, and teslas, respectively.

2. A method of constructing a low core loss, bulk amorphous metal magnetic component as recited by claim 1, wherein said step (a) comprises cutting amorphous metal strip material using a cutting blade, a cutting wheel, a water jet or an electro-discharge machine.

3. A bulk amorphous metal magnetic component for use in an electric motor constructed in accordance with the method of claim 2.

4. A method of constructing a low core loss, bulk amorphous metal magnetic component for use in an electric motor comprising, in sequence, the steps of:

(a) winding an amorphous metal ribbon about a mandrel to form a generally rectangular core having generally radiused corners;

(b) annealing said wound, rectangular core;

(c) impregnating said wound, rectangular core with an epoxy resin and curing said epoxy resin impregnated rectangular core;

(d) cutting the short sides of said generally rectangular core to form two polyhedrally shaped magnetic components having a predetermined three-dimensional geometry that is the approximate size and shape of said short sides of said generally rectangular core;

(e) removing the generally radiused corners from the long sides of said generally rectangular core; and (f) cutting the long sides of said generally rectangular core to form a plurality of magnetic components having said predetermined three-dimensional geometry, wherein said component has a core loss less than "L," wherein L is given by the formula $L=0.0074\ f\ (B_{max})^{1.3}+0.000282\ f^{1.5}\ (B_{max})^{2.4}$, the core loss, the excitation frequency and the peak induction level being measured in watts per kilogram, hertz, and teslas, respectively.

5. A method of constructing a bulk amorphous metal magnetic component as recited by claim 4, wherein at least one of said steps (d) and (f) comprises cutting amorphous metal strip material using a cutting blade, a cutting wheel, a water jet or an electro-discharge machine.

6. A bulk amorphous metal magnetic component for use in an electric motor constructed in accordance with the method of claim 4.

* * * * *